(12) United States Patent
Yallouz et al.

(10) Patent No.: US 11,575,594 B2
(45) Date of Patent: Feb. 7, 2023

(54) DEADLOCK-FREE REROUTING FOR RESOLVING LOCAL LINK FAILURES USING DETOUR PATHS

(71) Applicant: MELLANOX TECHNOLOGIES TLV LTD., Raanana (IL)

(72) Inventors: Jose Yallouz, Kibbutz Shaar Hamakim (IL); Lion Levi, Yavne (IL); Tamir Ronen, Pardes Hana-Karkur (IL); Vladimir Koushnir, Rishon Lezion (IL); Neria Uzan, Jerusalem (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 181 days.

(21) Appl. No.: 17/016,464

(22) Filed: Sep. 10, 2020

(65) Prior Publication Data

US 2022/0078104 A1    Mar. 10, 2022

(51) Int. Cl.
| | |
|---|---|
| G06F 15/16 | (2006.01) |
| H04L 45/00 | (2022.01) |
| H04L 41/12 | (2022.01) |
| H04L 45/48 | (2022.01) |
| H04L 12/44 | (2006.01) |

(52) U.S. Cl.
CPC .............. H04L 45/22 (2013.01); H04L 12/44 (2013.01); H04L 41/12 (2013.01); H04L 45/48 (2013.01)

(58) Field of Classification Search
CPC ......... H04L 45/22; H04L 12/44; H04L 41/12; H04L 45/48
See application file for complete search history.

(56) References Cited

U.S. PATENT DOCUMENTS

| 4,312,064 A | 1/1982 | Bench et al. |
|---|---|---|
| 6,115,385 A | 9/2000 | Vig |

(Continued)

FOREIGN PATENT DOCUMENTS

| WO | 2012037494 A1 | 3/2012 |
|---|---|---|
| WO | 2016105446 A1 | 6/2016 |

OTHER PUBLICATIONS

Cisco, "Cisco ACI Remote Leaf Architecture White Paper", Aug. 2019 (Year: 2019).*

(Continued)

*Primary Examiner* — Oscar A Louie
*Assistant Examiner* — Messeret F Gebre
(74) *Attorney, Agent, or Firm* — Kligler & Associates Patent Attorneys Ltd

(57) ABSTRACT

A computing system including network elements arranged in at least one group. A plurality of the network elements are designated as spines and another plurality are designated as leaves, the spines and leaves are interconnected in a bipartite topology, and at least some of the spines and leaves are configured to: receive in a first leaf, from a source node, packets destined to a destination node via a second leaf, forward the packets via a first link to a first spine and to the second leaf via a second link, in response to detecting that the second link has failed, apply a detour path from the first leaf to the second leaf, including a detour link in a spine-to-leaf direction and another detour link a leaf-to-spine direction, and forward subsequent packets, which are received in the first leaf and are destined to the second leaf, via the detour path.

30 Claims, 5 Drawing Sheets

(56) References Cited

U.S. PATENT DOCUMENTS

| | | |
|---|---|---|
| 6,169,741 B1 | 1/2001 | Lemaire et al. |
| 6,480,500 B1 | 11/2002 | Erimli et al. |
| 6,532,211 B1 | 3/2003 | Rathonyi et al. |
| 6,553,028 B1 | 4/2003 | Tang et al. |
| 6,614,758 B2 | 9/2003 | Wong |
| 6,665,297 B1 | 12/2003 | Harigochi et al. |
| 6,775,268 B1 | 8/2004 | Wang et al. |
| 6,795,886 B1 | 9/2004 | Nguyen |
| 6,804,532 B1 | 10/2004 | Moon et al. |
| 6,807,175 B1 | 10/2004 | Jennings et al. |
| 6,831,918 B1 | 12/2004 | Kavak |
| 6,912,589 B1 | 6/2005 | Jain et al. |
| 6,912,604 B1 | 6/2005 | Tzeng et al. |
| 6,950,428 B1 | 9/2005 | Horst et al. |
| 7,010,607 B1 | 3/2006 | Bunton |
| 7,076,569 B1 | 7/2006 | Bailey et al. |
| 7,221,676 B2 | 5/2007 | Green et al. |
| 7,234,001 B2 | 6/2007 | Simpson et al. |
| 7,274,869 B1 | 9/2007 | Pan et al. |
| 7,286,535 B2 | 10/2007 | Ishikawa et al. |
| 7,401,157 B2 | 7/2008 | Costantino et al. |
| 7,676,597 B2 | 3/2010 | Kagan et al. |
| 7,746,854 B2 | 6/2010 | Ambe et al. |
| 7,899,930 B1 | 3/2011 | Turner et al. |
| 7,924,837 B1 | 4/2011 | Shabtay et al. |
| 7,936,770 B1 | 5/2011 | Frattura et al. |
| 7,969,980 B1 | 6/2011 | Florit et al. |
| 8,094,569 B2 | 1/2012 | Gunukula et al. |
| 8,175,094 B2 | 5/2012 | Bauchot et al. |
| 8,195,989 B1 | 6/2012 | Lu et al. |
| 8,213,315 B2 | 7/2012 | Crupnicoff et al. |
| 8,401,012 B2 | 3/2013 | Underwood et al. |
| 8,489,718 B1 | 7/2013 | Brar et al. |
| 8,495,194 B1 | 7/2013 | Brar et al. |
| 8,570,865 B2 | 10/2013 | Goldenberg et al. |
| 8,576,715 B2 | 11/2013 | Bloch et al. |
| 8,605,575 B2 | 12/2013 | Gunukula et al. |
| 8,621,111 B2 | 12/2013 | Marr et al. |
| 8,625,427 B1 | 1/2014 | Terry et al. |
| 8,681,641 B1 | 3/2014 | Sajassi et al. |
| 8,755,389 B1 | 6/2014 | Poutievski et al. |
| 8,774,063 B2 | 7/2014 | Beecroft |
| 8,867,356 B2 | 10/2014 | Bloch et al. |
| 8,873,567 B1 | 10/2014 | Mandal et al. |
| 8,908,704 B2 | 12/2014 | Koren et al. |
| 9,014,006 B2 | 4/2015 | Haramaty et al. |
| 9,042,234 B1 | 5/2015 | Liljenstolpe et al. |
| 9,137,143 B2 | 9/2015 | Parker et al. |
| 9,231,888 B2 | 1/2016 | Bogdanski et al. |
| 9,264,382 B2 | 2/2016 | Bogdanski et al. |
| 9,385,949 B2 | 7/2016 | Vershkov et al. |
| 9,544,185 B1 * | 1/2017 | Yadav ................. H04L 41/0668 |
| 9,548,960 B2 | 1/2017 | Haramaty et al. |
| 9,571,400 B1 | 2/2017 | Mandal et al. |
| 9,729,473 B2 | 8/2017 | Haramaty et al. |
| 10,200,294 B2 | 2/2019 | Shpiner et al. |
| 10,644,995 B2 | 5/2020 | Levy et al. |
| 2001/0043564 A1 | 11/2001 | Bloch et al. |
| 2001/0043614 A1 | 11/2001 | Viswanadham et al. |
| 2002/0009073 A1 | 1/2002 | Furukawa et al. |
| 2002/0013844 A1 | 1/2002 | Garrett et al. |
| 2002/0026525 A1 | 2/2002 | Armitage |
| 2002/0039357 A1 | 4/2002 | Lipasti et al. |
| 2002/0071439 A1 | 6/2002 | Reeves et al. |
| 2002/0085586 A1 | 7/2002 | Tzeng |
| 2002/0136163 A1 | 9/2002 | Kawakami et al. |
| 2002/0138645 A1 | 9/2002 | Shinomiya et al. |
| 2002/0141412 A1 | 10/2002 | Wong |
| 2002/0165897 A1 | 11/2002 | Kagan et al. |
| 2002/0176363 A1 | 11/2002 | Durinovic-Johri et al. |
| 2003/0016624 A1 | 1/2003 | Bare |
| 2003/0039260 A1 | 2/2003 | Fujisawa |
| 2003/0065856 A1 | 4/2003 | Kagan et al. |
| 2003/0079005 A1 | 4/2003 | Myers et al. |
| 2003/0097438 A1 | 5/2003 | Bearden et al. |
| 2003/0223453 A1 | 12/2003 | Stoler et al. |
| 2004/0024903 A1 | 2/2004 | Costatino et al. |
| 2004/0062242 A1 | 4/2004 | Wadia et al. |
| 2004/0111651 A1 | 6/2004 | Mukherjee et al. |
| 2004/0202473 A1 | 10/2004 | Nakamura et al. |
| 2005/0013245 A1 | 1/2005 | Sreemanthula et al. |
| 2005/0154790 A1 | 7/2005 | Nagata et al. |
| 2005/0157641 A1 | 7/2005 | Roy |
| 2005/0259588 A1 | 11/2005 | Preguica |
| 2006/0126627 A1 | 6/2006 | Diouf |
| 2006/0143300 A1 | 6/2006 | See et al. |
| 2006/0182034 A1 | 8/2006 | Klinker et al. |
| 2006/0215645 A1 | 9/2006 | Kangyu |
| 2006/0291480 A1 | 12/2006 | Cho et al. |
| 2007/0030817 A1 | 2/2007 | Arunachalam et al. |
| 2007/0058536 A1 | 3/2007 | Vaananen et al. |
| 2007/0058646 A1 | 3/2007 | Hermoni |
| 2007/0070998 A1 | 3/2007 | Sethuram et al. |
| 2007/0091911 A1 | 4/2007 | Watanabe et al. |
| 2007/0104192 A1 | 5/2007 | Yoon et al. |
| 2007/0183418 A1 | 8/2007 | Riddoch et al. |
| 2007/0223470 A1 | 9/2007 | Stahl |
| 2007/0237083 A9 | 10/2007 | Oh et al. |
| 2008/0002690 A1 | 1/2008 | Ver Steeg et al. |
| 2008/0101378 A1 | 5/2008 | Krueger |
| 2008/0112413 A1 | 5/2008 | Pong |
| 2008/0165797 A1 | 7/2008 | Aceves |
| 2008/0186981 A1 | 8/2008 | Seto et al. |
| 2008/0189432 A1 | 8/2008 | Abali et al. |
| 2008/0267078 A1 | 10/2008 | Farinacci et al. |
| 2008/0298248 A1 | 12/2008 | Roeck et al. |
| 2009/0010159 A1 | 1/2009 | Brownell et al. |
| 2009/0022154 A1 | 1/2009 | Kiribe et al. |
| 2009/0097496 A1 | 4/2009 | Nakamura et al. |
| 2009/0103534 A1 | 4/2009 | Malledant et al. |
| 2009/0119565 A1 | 5/2009 | Park et al. |
| 2009/0262741 A1 | 10/2009 | Jungck et al. |
| 2010/0020796 A1 | 1/2010 | Park et al. |
| 2010/0039959 A1 | 2/2010 | Gilmartin |
| 2010/0049942 A1 | 2/2010 | Kim et al. |
| 2010/0111529 A1 | 5/2010 | Zeng et al. |
| 2010/0141428 A1 | 6/2010 | Mildenberger et al. |
| 2010/0216444 A1 | 8/2010 | Mariniello et al. |
| 2010/0284404 A1 | 11/2010 | Gopinath et al. |
| 2010/0290385 A1 | 11/2010 | Ankaiah et al. |
| 2010/0290458 A1 | 11/2010 | Assarpour et al. |
| 2010/0315958 A1 | 12/2010 | Luo et al. |
| 2011/0019673 A1 | 1/2011 | Fernandez |
| 2011/0080913 A1 | 4/2011 | Liu et al. |
| 2011/0085440 A1 | 4/2011 | Owens et al. |
| 2011/0085449 A1 | 4/2011 | Jeyachandran et al. |
| 2011/0090784 A1 | 4/2011 | Gan |
| 2011/0164496 A1 | 7/2011 | Loh et al. |
| 2011/0164518 A1 | 7/2011 | Daraiseh et al. |
| 2011/0225391 A1 | 9/2011 | Burroughs et al. |
| 2011/0249679 A1 | 10/2011 | Lin et al. |
| 2011/0255410 A1 | 10/2011 | Yamen et al. |
| 2011/0265006 A1 | 10/2011 | Morimura et al. |
| 2011/0299529 A1 | 12/2011 | Olsson et al. |
| 2012/0020207 A1 | 1/2012 | Corti et al. |
| 2012/0075999 A1 | 3/2012 | Ko et al. |
| 2012/0082057 A1 | 4/2012 | Welin et al. |
| 2012/0144065 A1 | 6/2012 | Parker et al. |
| 2012/0147752 A1 | 6/2012 | Ashwood-Smith et al. |
| 2012/0163797 A1 | 6/2012 | Wang |
| 2012/0170582 A1 | 7/2012 | Abts et al. |
| 2012/0207175 A1 | 8/2012 | Raman et al. |
| 2012/0287791 A1 | 11/2012 | Xi et al. |
| 2012/0300669 A1 | 11/2012 | Zahavi |
| 2012/0314706 A1 | 12/2012 | Liss |
| 2013/0044636 A1 | 2/2013 | Koponen et al. |
| 2013/0071116 A1 | 3/2013 | Ong |
| 2013/0083701 A1 | 4/2013 | Tomic et al. |
| 2013/0114599 A1 | 5/2013 | Arad |
| 2013/0114619 A1 | 5/2013 | Wakumoto |
| 2013/0159548 A1 | 6/2013 | Vasseur et al. |
| 2013/0170451 A1 | 7/2013 | Krause et al. |
| 2013/0182604 A1 | 7/2013 | Moreno et al. |
| 2013/0204933 A1 | 8/2013 | Cardona et al. |

(56) References Cited

U.S. PATENT DOCUMENTS

| | | | |
|---|---|---|---|
| 2013/0208720 | A1 | 8/2013 | Ellis et al. |
| 2013/0242745 | A1 | 9/2013 | Umezuki |
| 2013/0259033 | A1 | 10/2013 | Hefty |
| 2013/0297757 | A1 | 11/2013 | Han et al. |
| 2013/0315237 | A1 | 11/2013 | Kagan et al. |
| 2013/0322256 | A1 | 12/2013 | Bader et al. |
| 2013/0329727 | A1 | 12/2013 | Rajagopalan et al. |
| 2013/0336116 | A1 | 12/2013 | Vasseur et al. |
| 2013/0336164 | A1 | 12/2013 | Yang et al. |
| 2014/0016457 | A1 | 1/2014 | Enyedi et al. |
| 2014/0022942 | A1 | 1/2014 | Han et al. |
| 2014/0043959 | A1 | 2/2014 | Owens et al. |
| 2014/0059440 | A1 | 2/2014 | Sasaki et al. |
| 2014/0105034 | A1 | 4/2014 | Sun |
| 2014/0140341 | A1 | 5/2014 | Bataineh et al. |
| 2014/0169173 | A1 | 6/2014 | Naouri et al. |
| 2014/0192646 | A1 | 7/2014 | Mir et al. |
| 2014/0198636 | A1 | 7/2014 | Thayalan et al. |
| 2014/0211808 | A1 | 7/2014 | Koren et al. |
| 2014/0269305 | A1 | 9/2014 | Nguyen |
| 2014/0313880 | A1 | 10/2014 | Lu et al. |
| 2014/0328180 | A1 | 11/2014 | Kim et al. |
| 2014/0343967 | A1 | 11/2014 | Baker |
| 2015/0030033 | A1 | 1/2015 | Vasseur et al. |
| 2015/0052252 | A1 | 2/2015 | Gilde et al. |
| 2015/0092539 | A1 | 4/2015 | Sivabalan et al. |
| 2015/0124815 | A1 | 5/2015 | Beliveau et al. |
| 2015/0127797 | A1 | 5/2015 | Attar et al. |
| 2015/0131663 | A1 | 5/2015 | Brar et al. |
| 2015/0163144 | A1 | 6/2015 | Koponen et al. |
| 2015/0172070 | A1 | 6/2015 | Csaszar |
| 2015/0194215 | A1 | 7/2015 | Douglas et al. |
| 2015/0195204 | A1 | 7/2015 | Haramaty et al. |
| 2015/0249590 | A1 | 9/2015 | Gusat et al. |
| 2015/0295858 | A1 | 10/2015 | Chrysos et al. |
| 2015/0372916 | A1 | 12/2015 | Haramaty et al. |
| 2016/0012004 | A1 | 1/2016 | Arimilli et al. |
| 2016/0014636 | A1 | 1/2016 | Bahr et al. |
| 2016/0028613 | A1 | 1/2016 | Haramaty et al. |
| 2016/0043933 | A1 | 2/2016 | Gopalarathnam |
| 2016/0080120 | A1 | 3/2016 | Unger et al. |
| 2016/0080321 | A1 | 3/2016 | Pan et al. |
| 2016/0182378 | A1 | 6/2016 | Basavaraja et al. |
| 2016/0294715 | A1 | 10/2016 | Raindel et al. |
| 2016/0380893 | A1 | 12/2016 | Chopra et al. |
| 2017/0054445 | A1 | 2/2017 | Wang |
| 2017/0054591 | A1 | 2/2017 | Hyoudou et al. |
| 2017/0068669 | A1 | 3/2017 | Levy et al. |
| 2017/0070474 | A1 | 3/2017 | Haramaty et al. |
| 2017/0180243 | A1 | 6/2017 | Haramaty et al. |
| 2017/0187614 | A1 | 6/2017 | Haramaty et al. |
| 2017/0244630 | A1 | 8/2017 | Levy et al. |
| 2017/0270119 | A1 | 9/2017 | Kfir et al. |
| 2017/0286292 | A1 | 10/2017 | Levy et al. |
| 2017/0331740 | A1 | 11/2017 | Levy et al. |
| 2017/0358111 | A1 | 12/2017 | Madsen |
| 2018/0026878 | A1 | 1/2018 | Zahavi et al. |
| 2018/0062990 | A1* | 3/2018 | Kumar ............... H04L 45/70 |
| 2018/0089127 | A1* | 3/2018 | Flajslik ............ G06F 13/4022 |
| 2018/0139132 | A1 | 5/2018 | Edsall et al. |
| 2018/0302288 | A1 | 10/2018 | Schmatz |
| 2020/0042667 | A1 | 2/2020 | Swaminathan et al. |
| 2020/0067822 | A1* | 2/2020 | Malhotra ............ H04L 45/28 |
| 2020/0136956 | A1 | 4/2020 | Neshat |

OTHER PUBLICATIONS

K. Thulasiraman, M. Javed, T. Lin and G. Xue, "Logical topology augmentation for guaranteed survivability under multiple failures in IP-over-WDM optical network," 2009 IEEE 3rd International Symposium on Advanced Networks and Telecommunication Systems (ANTS), 2009, pp. 1-3 (Year: 2009).*

Astiti, A., Rakhmatsyah, A., & Nugroho, M. A. (2018). Link failure emulation with dijkstra and bellman-ford algorithm in software defined network architecture (case study: Telkom university topology) doi:http://dx.doi.org/10.1109/ICoICT.2018.8528809 (Year: 2018).*

N. Kamiyama, R. Kawahara and H. Yoshino, "Network topology design considering detour traffic caused by link failure," Networks 2008—The 13th International Telecommunications Network Strategy and Planning Symposium, 2008, pp. 1-8 (Year: 2008).*

Valadarsky et al., "Xpander: Towards Optimal-Performance Datacenters," Proceedings of CoNEXT '16, pp. 205-219, Dec. 2016.

Bilu et al., "Lifts, Discrepancy and Nearly Optimal Spectral Gap*," Combinatorica, vol. 26, No. 5, Bolyai Society—Springer-Verlag, pp. 495-519, year 2006.

Leiserson, C E., "Fat-Trees: Universal Networks for Hardware Efficient Supercomputing", IEEE Transactions on Computers, vol. C-34, No. 10, pp. 892-901, Oct. 1985.

Ohring et al., "On Generalized Fat Trees", Proceedings of the 9th International Symposium on Parallel Processing, pp. 37-44, Santa Barbara, USA, Apr. 25-28, 1995.

Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.

Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.

Matsuoka S., "You Don't Really Need Big Fat Switches Anymore—Almost", IPSJ SIG Technical Reports, vol. 2003, No. 83, pp. 157-162, year 2003.

Kim et al., "Technology-Driven, Highly-Scalable Dragonfly Topology", 35th International Symposium on Computer Architecture, pp. 77-78, Beijing, China, Jun. 21-25, 2008.

Jiang et al., "Indirect Adaptive Routing on Large Scale Interconnection Networks", 36th International Symposium on Computer Architecture, pp. 220-231, Austin, USA, Jun. 20-24, 2009.

Minkenberg et al., "Adaptive Routing in Data Center Bridges", Proceedings of 17th IEEE Symposium on High Performance Interconnects, New York, USA, pp. 33-41, Aug. 25-27, 2009.

Kim et al., "Adaptive Routing in High-Radix Clos Network", Proceedings of the 2006 ACM/IEEE Conference on Supercomputing (SC2006), Tampa, USA, Nov. 2006.

Infiniband Trade Association, "InfiniBandTM Architecture Specification vol. 1", Release 1.2.1, Nov. 2007.

Culley et al., "Marker PDU Aligned Framing for TCP Specification", IETF Network Working Group, RFC 5044, Oct. 2007.

Shah et al., "Direct Data Placement over Reliable Transports", IETF Network Working Group, RFC 5041, Oct. 2007.

Martinez et al., "Supporting fully adaptive routing in Infiniband networks", Proceedings of the International Parallel and Distributed Processing Symposium (IPDPS'03),Apr. 22-26, 2003.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Prisacari et al., "Performance implications of remote-only load balancing under adversarial traffic in Dragonflies", Proceedings of the 8th International Workshop on Interconnection Network Architecture: On-Chip, Multi-Chip, 4 pages, Jan. 22, 2014.

Li et al., "Multicast Replication Using Dual Lookups in Large Packet-Based Switches", 2006 IET International Conference on Wireless, Mobile and Multimedia Networks, , pp. 1-3, Nov. 6-9, 2006.

(56) References Cited

OTHER PUBLICATIONS

Nichols et al., "Definition of the Differentiated Services Field (DS Field) in the IPv4 and IPv6 Headers", Network Working Group, RFC 2474,20 pages, Dec. 1998.

Microsoft., "How IPv4 Multicasting Works", 22 pages, Mar. 28, 2003.

Suchara et al., "Network Architecture for Joint Failure Recovery and Traffic Engineering", Proceedings of the ACM SIGMETRICS joint international conference on Measurement and modeling of computer systems, pp. 97-108, Jun. 7-11, 2011.

IEEE 802.1Q, "IEEE Standard for Local and metropolitan area networks Virtual Bridged Local Area Networks", IEEE Computer Society, 303 pages, May 19, 2006.

Plummer, D., "An Ethernet Address Resolution Protocol," Network Working Group ,Request for Comments (RFC) 826, 10 pages, Nov. 1982.

Hinden et al., "IP Version 6 Addressing Architecture," Network Working Group ,Request for Comments (RFC) 2373, 26 pages, Jul. 1998.

Garcia et al., "On-the-Fly 10 Adaptive Routing in High-Radix Hierarchical Networks," Proceedings of the 2012 International Conference on Parallel Processing (ICPP), pp. 279-288, Sep. 10-13, 2012.

Dally et al., "Deadlock-Free Message Routing in Multiprocessor Interconnection Networks", IEEE Transactions on Computers, vol. C-36, No. 5, May 1987, pp. 547-553.

Nkposong et al., "Experiences with BGP in Large Scale Data Centers:Teaching an old protocol new tricks", 44 pages, Jan. 31, 3014.

"Equal-cost multi-path routing", Wikipedia, 2 pages, Oct. 13, 2014.

Thaler et al., "Multipath Issues in Unicast and Multicast Next-Hop Selection", Network Working Group, RFC 2991, 9 pages, Nov. 2000.

Glass et al., "The turn model for adaptive routing", Journal of the ACM, vol. 41, No. 5, pp. 874-903, Sep. 1994.

Mahalingam et al., "VXLAN: A Framework for Overlaying Virtualized Layer 2 Networks over Layer 3 Networks", Internet Draft, 20 pages, Aug. 22, 2012.

Sinha et al., "Harnessing TCP's Burstiness with Flowlet Switching", 3rd ACM SIGCOMM Workshop on Hot Topics in Networks (HotNets), 6 pages, Nov. 11, 2004.

Vishnu et al., "Hot-Spot Avoidance With Multi-Pathing Over InfiniBand: An MPI Perspective", Seventh IEEE International Symposium on Cluster Computing and the Grid (CCGrid'07), 8 pages, year 2007.

NOWLAB—Network Based Computing Lab, 2 pages, years 2002-2015 http://nowlab.cse.ohio-state.edu/publications/conf-presentations/2007/vishnu-ccgrid07.pdf.

Alizadeh et al.,"CONGA: Distributed Congestion-Aware Load Balancing for Datacenters", Cisco Systems, 12 pages, Aug. 9, 2014.

Geoffray et al., "Adaptive Routing Strategies for Modern High Performance Networks", 16th IEEE Symposium on High Performance Interconnects (HOTI '08), pp. 165-172, Aug. 26-28, 2008.

Anderson et al., "On the Stability of Adaptive Routing in the Presence of Congestion Control", IEEE Infocom, 11 pages, 2003.

Perry et al., "Fastpass: A Centralized "Zero-Queue" Datacenter Network", M.I.T. Computer Science & Artificial Intelligence Lab, 12 pages, year 2014.

Afek et al., "Sampling and Large Flow Detection in SDN", SIGCOMM '15, pp. 345-346, Aug. 17-21, 2015, London, UK.

Amante et al., "IPv6 Flow Label Specification", Request for Comments: 6437, 15 pages, Nov. 2011.

Shpigelman et al, U.S. Appl. No. 16/240,749, filed Jan. 6, 2019.

Shpiner et al., "Dragonfly+: Low Cost Topology for Scaling Datacenters", IEEE 3rd International Workshop on High-Performance Interconnection Networks in the Exascale and Big-Data Era (HiPINEB), pp. 1-9, Feb. 2017.

Zahavi et al., "Distributed Adaptive Routing for Big-Data Applications Running on Data Center Networks," Proceedings of the Eighth ACM/IEEE Symposium on Architectures for Networking and Communication Systems, New York, USA, pp. 99-110, Oct. 29-30, 2012.

MELLANOX White Paper, "The SHIELD: Self-Healing Interconnect," pp. 1-2, year 2019.

Cao et al., "Implementation Method for High-radix Fat-tree Deterministic Source-routing Interconnection Network", Computer Science ,vol. 39. Issue 12, pp. 33-37, 2012.

U.S. Appl. No. 17/079,543 Office Action dated Mar. 16, 2022.

EP Application #21204582.7 Search Report dated Mar. 18, 2022.

\* cited by examiner

INITIAL PATH
REMOTE → S1(5-2) → L3(0-6) → LOCAL
LOCAL → L3(6-0) → S1(2-5) → REMOTE

DETOUR PATH (LINK1 FAILS)
REMOTE → S1(5-1) → L2(0-2) → S3(1-2) → L3(2-6) → LOCAL

LOCAL → L3(6-2) → S3(2-1) → L2(2-0) → S1(1-5) → REMOTE

DEADLOCK-FREE REROUTING FOR RESOLVING LOCAL LINK FAILURES USING DETOUR PATHS

TECHNICAL FIELD

Embodiments described herein relate generally to data communication, and particularly to methods and systems for deadlock-free rerouting for resolving local link failures in a network using detour paths.

BACKGROUND

Communication networks used in applications such as High-Performance Computing (HPC) systems and datacenters typically comprise a large number of network elements interconnected by links. A high-reliability communication network should be able to recover quickly from link failure events.

Methods for recovery from link failures are known in the art. For example, a white paper by Mellanox® Technologies, 2019, describes a solution called SHIELD™—(Self-Healing Interconnect Enhancement for Intelligent Datacenters), which takes advantage of the intelligence already built into the latest generation of InfiniBand switches. By making the fabric capable with self-healing autonomy, the speed with which communications can be corrected in the face of a link failure can be sped up by 5000×, fast enough to save communications from expensive retransmissions or absolute failure.

Aspects of the SHIELD solution are described, for example, in U.S. Pat. No. 9,729,473, which describes a method in a network element that includes multiple interfaces for connecting to a communication network. The method includes receiving via an ingress interface packets that are not allowed to undergo re-routing and that are addressed to a destination via a first egress interface. The packets are forwarded via the first egress interface when there is a valid path from the first egress interface to the destination. When there is no valid path from the first egress interface to the destination, a second egress interface is selected from a group of multiple egress interfaces that have respective paths to the destination and are assigned to packets for which re-routing is allowed, and the packets are forwarded via the second egress interface until recovering a path to the destination.

U.S. Pat. No. 9,137,143, describes a multiprocessor computer system comprising a dragonfly processor interconnect network that comprises a plurality of processor nodes and a plurality of routers. The routers are operable to adaptively route data by selecting from among a plurality of network paths from a target node to a destination node in the dragonfly network based on one or more of network congestion information from neighboring routers and failed network link information from neighboring routers.

SUMMARY

An embodiment that is described herein provides a computing system including multiple network elements arranged in at least one group. A plurality of the network elements in the group are designated as spines and another plurality are designated as leaves, the spines and the leaves in the group are interconnected in a bipartite topology, and at least some of the spines and leaves in the group are configured to: receive in a first leaf, from a source node, packets destined to be delivered to a destination node via a second leaf, forward the packets by the first leaf, via a first link, to a first spine, and forward the packets by the first spine to the second leaf via a second link. In response to detecting that the second link has failed, apply a detour path from the first leaf to the second leaf, the detour path including a detour link that delivers packets in a spine-to-leaf direction and another detour link that delivers packets in a leaf-to-spine direction, and forward subsequent packets, which are received in the first leaf and are destined to the second leaf, via the detour path.

In some embodiments, the detour path is predefined, and the at least some of the spines and leaves in the group are configured to apply the detour path by applying the predefined detour path. In other embodiments, the at least some of the spines and leaves in the group are configured to apply the detour path by communicating with one another. In yet other embodiments, the failing link connects to a given port of a spine or a leaf, and the spine or the leaf is configured to apply the detour path by forwarding received packets to a port different from the given port.

In an embodiment, in response to detecting by the first leaf that the first link has failed, the at least some of the spines and leaves in the group are configured to select an alternative path from the first leaf to the second leaf via a second spine. In another embodiment, in response to detecting by the first spine that the second link has failed and further detecting by the first leaf that the first link is operative, the at least some of the spines and leaves in the group are configured to apply the detour path including a path from the first spine to the second leaf via a third leaf and a second spine. In yet another embodiment, the first spine is configured to receive packets destined to the second leaf via the second link, from a remote spine outside the group, and in response to detecting by the first spine that the second link has failed, the spines and leaves in the group are configured to apply the detour path including a partial path from the first spine to the second leaf via a third leaf and a second spine.

In some embodiments, the multiple spines and the multiple leaves are arranged in multiple groups, each group including multiple spines and multiple leaves interconnected in a bipartite topology, each group connects to other groups using spine-to-spine links, and a topology of the multiple spines and multiple leaves is deadlock-free using up to a number Nv of Virtual Lanes (VLs). When a single link failure occurs within the group but not in any other link in the topology, the spines and the leaves in the group are configured to resolve the failing link using a detour path that includes a detour link in a spine-to-leaf direction and another detour link delivering packets in a leaf-to-spine direction, and the topology including the detour path is also deadlock-free using up to Nv VLs. In other embodiments, a first spine in a first group connects via a first link to a second spine in a second group and connects via a second link to a third spine in the second group, both the second spine and the third spine connect to a common leaf in the second group, and in response to detecting, by the first spine, that the first link has failed, the first spine is configured to forward packets to the common leaf via the second link. In yet other embodiments, the spines and leaves are configured to support source node to destination node paths having up to four concatenated links, and in response to two or more single-link failures occurring within respective two or more groups simultaneously, the spines and leaves in the two or more groups are configured to resolve the link failures locally, using respective two or more detour paths, each detour path included a detour link that delivers packets in a spine-to-leaf direction and another detour link that delivers packets in a leaf-to-spine direction, and the topology including the two or more detour paths remains deadlock-free.

In an embodiment, a given spine and a given leaf in the group are preselected to serve as a detour link in a leaf-to-spine direction, and the at least some of the spines and leaves in the group are configured to apply a given detour path that includes a spine-to-leaf link and the detour link that resolves a link failure between another spine and another leaf in the group. In another embodiment, the group including Ns spines and Nl leaves, and the at least some of the spines and leaves in the group are configured to resolve, using a detour path that includes a spine-to-leaf link and the detour link, up to (N−1) simultaneous link failures within the group, N being a smallest number between Ns and Nl. In yet another embodiment, in response to detecting, by a leaf connected via a given link to the given spine that the given link has failed, the leaf is configured to connect to another spine for serving as a detour link with the given leaf instead of the given spine, and to notify the other leaves in the group to connect to the another spine.

In some embodiments, in response to detecting, by a spine connected via a given link to the given leaf that the given link has failed, the spine is configured to connect to another leaf for serving as a detour link with the given spine instead of the given leaf, and to notify the other spines in the group to connect to the another leaf. In other embodiments, the group belongs to a plurality of groups interconnected using spine-to-spine links, in each of the groups respective detour link in a spine-to-leaf direction and another detour link in a leaf-to-spine direction are preselected for locally resolving, using a detour path that includes the respective detour link and another detour link, up to a respective number N' of simultaneous link failures smaller than both the number of spines and the number of leaves in the group, the spines and the leaves in the groups support source node to destination node paths having up to four concatenated links, and a topology of the spines and the leaves in the groups is deadlock-free even when numbers up to N' of link failures are resolved simultaneously in the respective groups using the respective detour links.

There is additionally provided, in accordance with an embodiment that is described herein, a method including, in a computing system that includes multiple network elements arranged in at least one group, a plurality of the network elements in the group are designated as spines and another plurality are designated as leaves, the spines and the leaves in the group are interconnected in a bipartite topology, the method including receiving in a first leaf, from a source node, packets destined to be delivered to a destination node via a second leaf, and forwarding the packets by the first leaf, via a first link, to a first spine, and forwarding the packets by the first spine to the second leaf via a second link. In response to detecting that the second link has failed a detour path is applied from the first leaf to the second leaf, the detour path including a detour link that delivers packets in a spine-to-leaf direction and a detour link that delivers packets in a leaf-to-spine direction. Subsequent packets, which are received in the first leaf and are destined to the second leaf are forwarded via the detour path.

These and other embodiments will be more fully understood from the following detailed description of the embodiments thereof, taken together with the drawings in which:

DETAILED DESCRIPTION OF EMBODIMENTS

Overview

Figure 1:
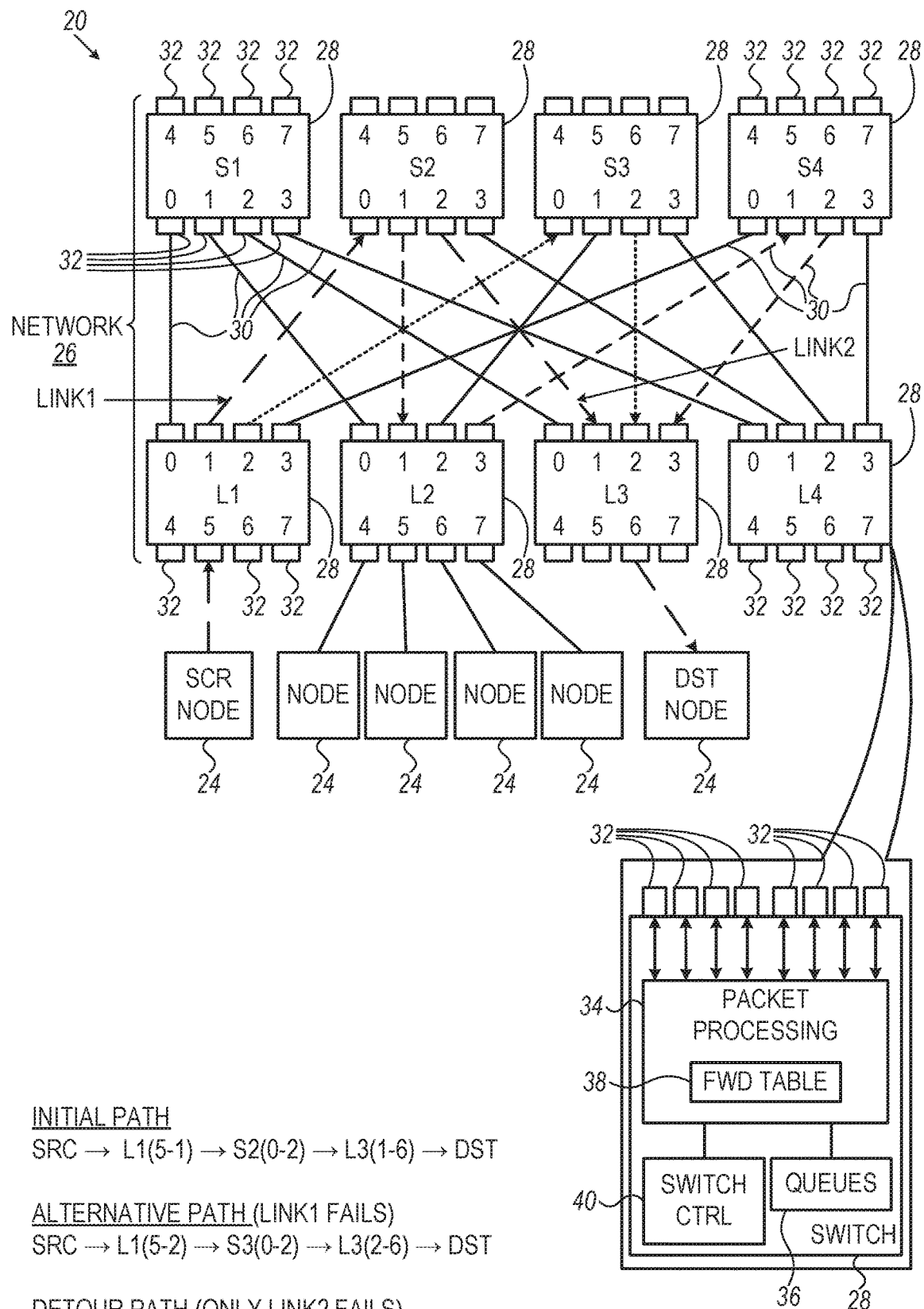
FIG. 1 is a block diagram that schematically illustrates a computing system in which a network recovers from link failures using deadlock-free detour paths, in accordance with an embodiment that is described herein.

Embodiments that are described herein provide improved methods and systems for recovering from link failures in a network.

A computing system typically comprises a network built from multiple network elements interconnected by links. When a link in the network fails, packets that are normally forwarded via this link may be dropped until establishing an alternative path to the destination.

In principle, the network may comprise a central entity that detects or is notified of a failing link and reconfigures one or more of the network elements so as to create an alternative path to the destination. Centralized recovery methods of this sort, however, react slowly and may take on the order of seconds, which is typically unacceptable in terms of network reliability.

Lossless networks typically apply flow control techniques to prevent buffer overfill and packet drop events. Rerouting in such networks, however, may result in buffers of multiple switches interconnected cyclically becoming full, preventing these switches from further sending or receiving packets. Such an undesired condition is referred to as a "deadlock condition" or simply "deadlock" for brevity. One way to avoid deadlock is to allocate buffers to multiple Virtual lanes (VLs), but this requires extra storage space. As will be described below, using certain detour paths, link failures are resolvable without causing deadlock.

In the disclosed embodiments, switches recover from a link failure by applying a local detour path, independently of remote link failures. This approach provides a fast recovery mechanism, until the link is fixed, or until a central entity reconfigures an alternative path. The disclosed embodiments are applicable for example, to topologies comprising one or more interconnected groups having bipartite topology.

In some embodiments, a computing system comprises multiple network elements arranged in at least one group, wherein a plurality of the network elements in the group are designated as spines and another plurality are designated as leaves. The spines and the leaves in the group are interconnected in a bipartite topology. The spines and leaves in the group are configured to receive in a first leaf, from a source node, packets destined to be delivered to a destination node via a second leaf. The first leaf forwards the packets via a first link to a first spine, which forwards the packets to the second leaf via a second link. In response to detecting that the second link has failed, at least some of the spines and leaves apply a detour path from the first leaf to the second leaf, the detour path including a detour link that delivers packets in a spine-to-leaf direction and a detour link that delivers packets in a leaf-to-spine direction. The spines and leaves forward subsequent packets, which are received in the first leaf and are destined to the second leaf, via the detour path.

The spines and leaves may apply the detour path in various ways. In one embodiment, the detour path is predefined, and the spines and leaves in the group are configured to apply the predefined detour path. In another embodiment, the spines and leaves in the group are configured to apply the detour path by communicating with one another. In yet another embodiment, the failing link connects to a given port of a spine or a leaf, and the spine or the leaf is configured to apply the detour path by forwarding received packets to a port different from the given port.

In some embodiments, in response to detecting by the first leaf that the first link has failed, the spines and leaves in the group are configured to select an alternative path from the first leaf to the second leaf via a second spine. In other embodiments, in response to detecting by the first spine that the second link has failed and further detecting by the first leaf that the first link is operative, the spines and leaves in the group are configured to apply the detour path including a path from the first spine to the second leaf via a third leaf and a second spine.

In some embodiments, the multiple spines and the multiple leaves are arranged in multiple groups, each group comprising multiple spines and multiple leaves interconnected in a bipartite topology, wherein each group connects to other groups using spine-to-spine links. This topology, also referred to herein as a "multi-group topology," is deadlock-free using up to a number Nv of Virtual Lanes (VLs). As an example, the Dragonfly Plus (DF+) topology comprises multiple bipartite groups and is deadlock-free using two VL values denoted, e.g., VL0 and VL1.

When a single link failure occurs within a group but not in any other link in the topology, at least some of the spines and leaves in the group are configured to resolve the failing link using a detour path that includes a detour link delivering packets in a spine-to-leaf direction and a detour link delivering packets in a leaf-to-spine direction. It can be shown that the multi-group topology including the detour path is also deadlock-free using up to Nv VLs. This is advantages because increasing the number of VLs used requires additional buffering space in memory.

The multi-group topology supports recovering from an inter-group link failure using an alternative inter-group link. The multi-group topology supports 3-hop, 4-hop and 6-hop paths from a source node to a destination node. It can be shown that if no 6-hop paths are used, multiple simultaneous intra-group single-link failures can be resolved by applying local detour paths in the respective groups, while the multi-group topology with the applied detour paths remaining deadlock-free.

In some embodiments, a given spine and a given leaf in a group are preselected to serve as a default detour link in a leaf-to-spine direction. In such embodiments, the spines and leaves in the group are configured to apply a given detour path that includes a detour link in a spine-to-leaf direction and the detour link, and that resolves a link failure between any other spine and any other leaf in the group (when the bipartite is fully connected). Consider, for example, a group comprising Ns spines and Nl leaves. The spines and leaves in the group are configured to resolve, using a detour path that includes the default detour link, up to (N−1) simultaneous link failures within the group, N being a smallest number between Ns and Nl. Resolving (N−1) simultaneous failures is possible when the bipartite topology is fully connected.

When a leaf connected via a given link to the given spine detects that the given link has failed, the leaf is configured to connect to another spine for serving as a default detour link with the given leaf instead of the given spine. The leaf also notifies the other leaves in the group to connect to the other spine. When a spine connected via a given link to the given leaf detects that the given link has failed, the spine is configured to connect to another leaf for serving as a default detour link with the leaf instead of the given leaf. The spine also notifies the other spines in the group to connect to the other leaf.

The method of predefining a default detour link that is shared among multiple detour paths, as described above, is applicable also in multi-group topologies. In such embodiments, using a detour path that includes the respective detour link, up to a respective number N' of simultaneous link failures smaller than both the number of spines and the number of leaves in the group can be resolved, under a constraint of source to destination node paths having up to four concatenated links. The multi-group topology is deadlock-free even when numbers up to N' of link failures are resolved simultaneously in the respective groups using the respective detour links. N' is achievable when the groups comprise fully connected bipartite topologies.

In the disclosed techniques, spines and leaves in one group resolve local link failures independently of other groups. The group resolves the link failure by applying a detour path that includes a detour link from a leaf to a spine, without causing deadlock. This allows fast rerouting for resolving link failures in complex topologies such as the DF+.

System Description for Standalone Bipartite Topology

FIG. 1 is a block diagram that schematically illustrates a computing system 20 in which a network recovers from link failures using deadlock-free detour paths, in accordance with an embodiment that is described herein.

In computing system 20 network nodes 24 communicate with one another over a network 26, which is built from multiple network elements 28. In the example of FIG. 1, network 26 comprises four leaf network elements denoted L1 . . . L4 and four spine network elements denoted S1 . . . S4. In the description that follows leaf and spine network elements are also referred to simply as "leaves" and "spines" for brevity. Network 26 is also referred to as a "group" of spines and leaves.

In the example of FIG. 1, network elements 28 are interconnected in a fully connected bipartite topology, i.e., each spine connects to all leaves and each leaf connects to all spines. A bipartite topology can also be viewed as a 2-level Fat-Tree (FT) topology. The network nodes are connected only to leaves. In FIG. 1, the spine network elements are connected only to leaf network elements.

In general, a bipartite graph refers to a graph in which vertices are partitioned into two sets, and every edge in the graph has an endpoint in each of the two sets. In the present context, a bipartite topology comprises multiple spines and multiple leaves, wherein each spine may connect to one or more leaves, and each leaf may connect to one or more spines. In other words, spine-to-spine and leaf-to-leaf links are not allowed. A bipartite topology is referred to as "fully connected" when each spine connects to all leaves and each leaf connects to all spines. In general, however, a bipartite topology is not necessarily fully connected, in which case, a spine (or leaf) may connect to a partial subset of the entire leaves (spines).

In the example of FIG. 1, network elements 28 comprise switches. In other embodiments, however, other suitable network elements such as routers can also be used. Switch 28 comprises multiple ports 32, a packet processor 34, and a memory 36, e.g., for storing in queues packets awaiting transmission. The switch connects using ports 32 to other switches and/or to network nodes 24. In FIG. 1, four ports used for intra-bipartite connections are numbered 0 . . . 3 and four ports used for external connections are numbered 4 . . . 7.

Each port 32 serves both as an ingress port for receiving packets from another switch or from a network node, and as an egress port for transmitting packets to another switch or to a network node. Packet processor 34 applies to packets received via ports 32 various processing such as verification, filtering, prioritization, and forwarding. Packet processor 34 applies to packets to be transmitted to the network processing such as modifying a Virtual Lane (VL) with which the packets are associated.

Packet processor 34 may perform packet forwarding using a forwarding table 38, based, for example, on source and destination addresses carried in a packet header. Using the forwarding table, the switch determines an egress port for each received packet. Switch 28 stores received packets that have been processed and await transmission in queues in memory 36. In alternative embodiments, other packet processing and forwarding methods such as using Access Control Lists (ACLs) can also be used.

Switch 28 comprises a switch controller 40. Among other tasks, switch controller 40 updates forwarding table 38 for creating, together with other switches in network 26, a detour path that resolves a network malfunction due to a link failure. In some embodiments, the switch controller stores one or more predefined detour paths. Upon a link failure, the switch controller updates forwarding table 38 in accordance with a respective predefined detour path. In other embodiments, switch controller 40 communicates with other switches in network 26 for selecting a detour path, and applies the selected detour path by updating forwarding table 38.

In FIG. 1, a network node denoted "SRC node" sends packets over network 26 to another network node denoted "DST node." The path from SRC node to DST node includes leaf L1, spine S2 and leaf L3. Leaf L1 is configured to forward packets destined to DST node and received via port 5 to port 1, which connects to port 0 of spine S2. Spine S2 forwards the packets received from port 0 and destined to DST node to port 2, which connects to port 1 of leaf L3. L3 forwards packets destined to DST node and received via port 1 to port 6, to which DST node is connected.

Let "Li(n–m)" denote an $i^{th}$ leaf forwarding packets received via port 'n' to port 'm'. Similarly, let "Sj(k–l)" denote a $j^{th}$ spine forwarding packets received via port 'k' to port 'l'. Using these notations, the initial path from SRC node to DST node is given by: SRC node→L1(5-1)→S2(0-2)→L3(1-6)→DST node.

Let "Li(n)" denote the $n^{th}$ port of leaf Li, and let "Sj(m)" denote the $m^{th}$ port of spine Sj. Within the bipartite topology, the initial path includes a first link denoted "Link1" from L1(1) to S2(0), and a second link denoted "Link2" from S2(2) to L3(1). When one of Link1 and Link2 fails, the entire path from SRC node to DST node fails. Next the cases of Link1 or Link2 failing are described separately.

In response to detecting by L1 that Link1 has failed, the spines and the leaves in network 26 apply an alternative path from L1 to the L3 via a spine other than S2. In the example of FIG. 1, the alternative path is given by SRC node→L1 (5-2)→S3(0-2)→L3(2-6)→DST node. When applying the alternative path, packets received via port 5 of L1 and destined to DST node are forwarded to port 2 of L1 (and not to port 1 as in the initial path).

In response to detecting by S2 that Link2 has failed, and further detecting by L1 that Link1 is operative, the spines and the leaves in network 26 apply a detour path that includes a path from spine S2 to leaf L3 via another leaf, e.g., L2 and another spine, e.g., S4. In this example, the detour path is given by SRC node→L1(5-1)→S2(0-1)→L2 (1-3)→S4(1-2)→L3(3-6)→DST node. When applying the alternative path, packets received at port 0 of S2 and destined to DST node are forwarded to port 1 of S2 (and not to port 2 as in the initial path).

Note that unlike the alternative path applied when Link1 fails, a detour path applied when Link2 fails includes a detour link from a leaf to a spine. In the example of FIG. 1, the detour link connects between L2(3) and S4(1). This creates a down-up turn from S2(1) down to L2(1) and from L2(3) up to S4(1), which typically requires increasing the packet VL to prevent deadlock. As will be described below, however, under suitable constraints, the detour path creates no deadlock.

In the description that follows and in the claims the term "detour path" refers to a path established within a local group of spines and leaves, the detour path includes a spine-to-leaf detour link and a leaf-to-spine detour link.

The alternative path and the detour path described in the examples above are not unique, and other alternative and detour paths can also be used. For example, a different detour path given by SRC node→L1(5-1)→S2(0-1)→L2(1-2)→S3(1-2)→L3(2-6)→DST node, can also be used.

System Description for Bipartite Topology Having External Connections

Figure 2:
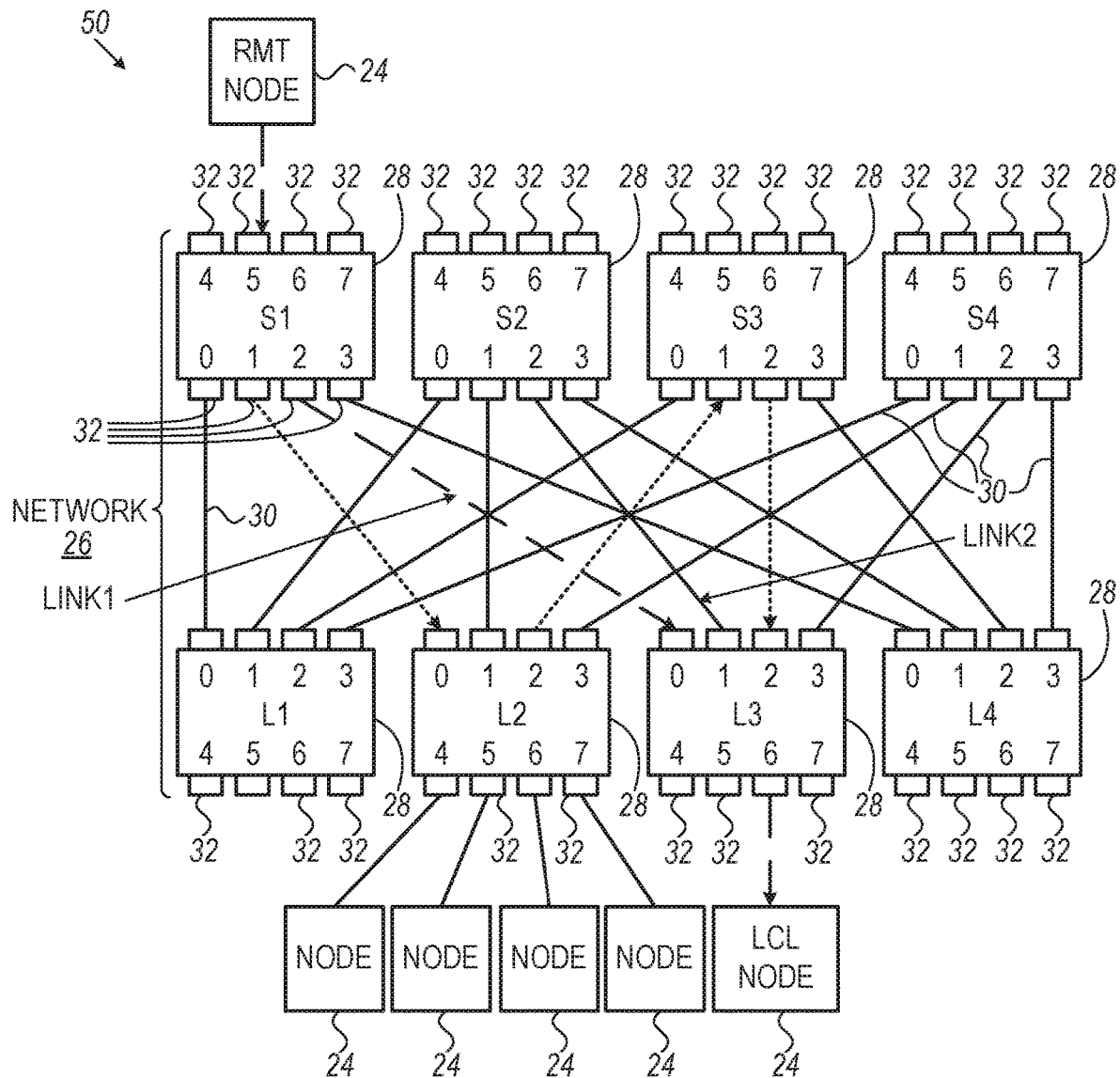
FIG. 2 is a block diagram that schematically illustrates a computing system in which a network recovers from link failures using deadlock-free detour paths, in accordance with another embodiment that is described herein.

FIG. 2 is a block diagram that schematically illustrates a computing system 50 in which a network recovers from link failures using deadlock-free detour paths, in accordance with another embodiment that is described herein.

Similarly to computing system 20 of FIG. 1, computing system 50 comprises network 26, which comprises network elements (e.g., switches) 28 interconnected using links 30 in a bipartite topology.

In computing system 50 network nodes 24 communicate with one another over network 26. Some of network nodes 24 such as a network node denoted "LCL node" are local nodes coupled to the leaves of network 26. Other network nodes 24 such as a network node denoted "RMT node" are remote nodes that are indirectly coupled to the spines of network 26. As will be described further below, a remote network node may comprise, for example, a local network node in another group of spines and leaves.

In FIG. 2, RMT node sends packets over network 26 to LCL node over an initial path that includes S1 and L3. S1 is configured to forward packets destined to LCL node and received via port 5 to port 2, which connects to port 0 of leaf L3. Leaf L3 forwards packets destined to LCL node and received via port 0 to port 6, to which DST node is connected. The path from RMT node (stating at S1) to LCL node is given by RMT node→S1(5-2)→L3(0-6)→LCL node. Within the bipartite topology, the path contains a link denoted "Link1" from S1(2) to L3(0). When Link1 fails, the entire path from RMT node to LCL node fails.

In response to detecting by S1 that Link1 has failed, the spines and leaves in network 26 are configured to apply a detour path including a partial path from the S1 to the L3 via another leaf and another spine. In the example of FIG. 2, the detour path is given by RMT node→S1(5-1)→L2(0-2)→S3 (1-2)→L3(2-6)→LCL node. The detour path includes a detour link in a spine-to-leaf direction from S1(1) to L2(0) and a detour link in a leaf-to-spine direction from L2(2) to S3(1). When applying the alternative path, packets received via port 6 and destined to DST node are forwarded to port 1.

Network 26 in FIGS. 1 and 2, that each comprises eight network elements are given by way of example, and other suitable networks can also be used. For example, practical networks such as network 26 typically comprise tens or even hundreds of network elements. Although in FIGS. 1 and 2 network 26 comprises an equal number of spines and leaves, this is not mandatory, and in other embodiments, different numbers of spines and leaves in a group can also be used.

Computing systems 20 and 50 may be used in various applications such as in High Performance Computing (HPC) and in datacenters.

Methods for Recovery from Link Failures in a
2-Level Fat-Tree Topology

Consider first a 2-level Fat-Tree (FT) topology in which a single link fails. The failing link may be any link connecting between the spines and leaves of the 2-level FT topology and that can be bypassed using a detour path. It can be shown that in a 2-level FT topology, a detour path that includes a single leaf-to-spine detour link is deadlock-free. This means that any link failure in a 2-level FT can be resolved using a detour path without causing deadlock. This argument is based on a necessary condition according to which preventing deadlock requires preventing cyclic paths having a length larger than two. In the 2-level FT case, it can be shown that a three-link cyclic path does not exist, and that cyclic paths having four or more links contain at least two leaf-to-spine detour paths.

Based on the above argument, in an embodiment, a method for recovery from a single link failure in a 2-level FT includes the following steps:
  upon (i) detecting by a spine that a link toward a leaf has failed, or (ii) detecting by a leaf that a link toward a spine has failed, do:
  If the spine or leaf has an alternative path to the destination node, forward the packets through the alternative path. This is a Fault Rollback (FR) type of solution.
  Otherwise, the spine selects another port toward the leaves, or the leaf selects another port towards the spines, and the spine or the leaf forwards the packets via the selected port. This operation creates a detour path that includes a spine-to-leaf detour link and a leaf-to-spine detour link.

Next consider an embodiment comprising a 2-level FT in which a spine and a leaf are preselected to serve as a default detour link in the leaf-to-spine direction. These selected spine and leaf are also respectively referred to as a "detour spine" and a "detour leaf." In FIG. 2, for example, assume that the default detour link is preselected between a detour leaf L4(3) and a detour spine S4(3). When the 2-level FT topology is fully connected, a link failure between any other spine (e.g., S1 . . . S3) and any other leaf (e.g., L1 . . . L3) in the 2-level FT can be resolved using a detour path that includes the detour link. For example, in FIG. 2, when the link from S2(2) to L3(1) fails, a detour path given by S2(3)→L4(1-3)→S4(3-2)→L3(3) may be used to bypass the faulty link. Note that when the FT (bipartite) topology is not fully connected, only a partial subset of the link failures between the other spines and leaves are resolvable using detour paths.

Using a default detour link allows resolving multiple link failures as described herein. Let Ns and Nl denote respective numbers of spines and leaves in the 2-level FT. Using detour paths that share the default detour link as described above, up to (N−1) simultaneous link failures within the 2-level FT can be resolved without credit loops, wherein N is the smallest number between Ns and Nl. This can be shown by showing that a corresponding connectivity graph has no cycles. Note that resolving (N−1) simultaneous link failures is achievable when the bipartite topology is fully connected. Otherwise, the number of link failures that can be resolved simultaneously is smaller than (N−1).

The default detour link may be included in a detour path only when both the preselected detour spine and detour leaf are accessible. For example, when a link from a leaf to the detour spine fails, the default detour link should be modified by replacing the given spine.

In some embodiments, in response to detecting, by a leaf connected via a given link to the detour spine, that the given link has failed, the leaf is configured to connect to an alternative spine for serving as a detour link with the leaf instead of the detour spine. The leaf also notifies the other leaves in the 2-level FT to connect to the alternative spine. For example, in FIG. 2, when the link from L3(3) to S4(2) fails, the default detour link may be redefined, e.g., from L4(3) to S3(3).

In some embodiments, in response to detecting, by a spine connected via a given link to the detour leaf that the given link has failed, the spine is configured to connect to another leaf for serving as a detour link with the leaf instead of the detour leaf. The spine also notifies the other spines in the 2-level FT to connect to the other leaf. For example, in FIG. 2, when the link from S3(3) to L4(2) fails, the default detour link may be redefined, e.g., from L3(3) to S4(2).

Methods for Recovery from a Link Failure in a
Bipartite Topology

Figure 3:
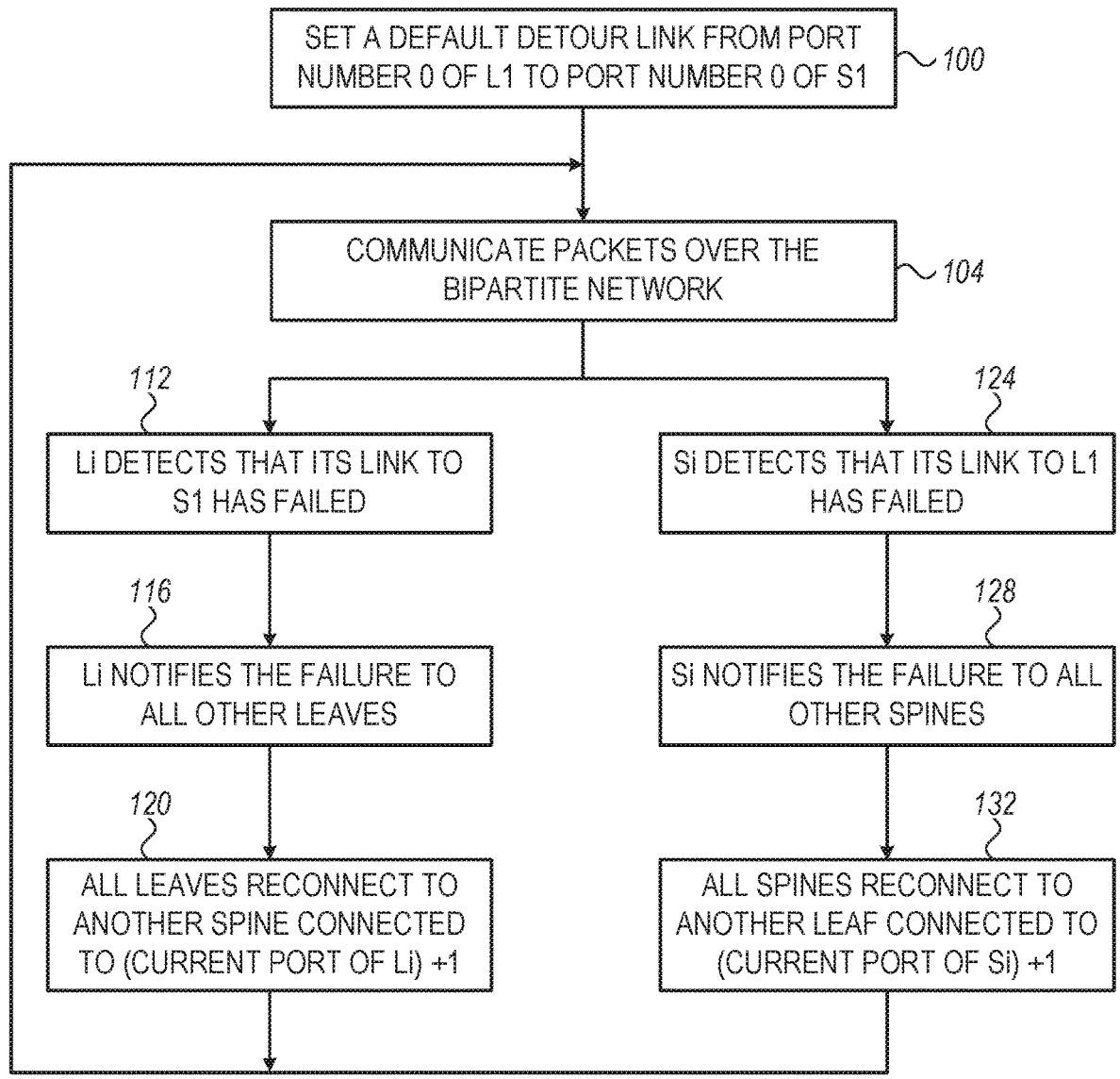
FIG. 3 is a flow chart that schematically illustrates a method for recovery from a link failure in a bipartite topology using a default detour link that participates in multiple detour paths, in accordance with an embodiment that is described herein.

FIG. 3 is a flow chart that schematically illustrates a method for recovery from a link failure in a bipartite topology using a default detour link that participates in multiple detour paths, in accordance with an embodiment that is described herein.

The method of FIG. 3 will be described with reference to FIG. 2. In the bipartite topology of FIG. 2 spines are connected to the leaves in a common port order, so that down ports of S1 connect to ports number 0 of the leaves, down ports of S2 connect to ports number 1 of the leaves, and so on. An ordered connectivity of this sort allows efficient assignment of detour paths. Note that the connectivity order of FIG. 2 is not unique and other connectivity orders can be used in the method of FIG. 3.

The method of FIG. 3 begins with the spines and leaves in network 26 configured to define a default detour link between ports L1(0) and S1(0), at a default detour link setting step 100. S1 thus serves as a current detour spine and L1 serves as a current detour leaf. The default detour link is to be included in detour paths that resolve link failures between spines other than S1 and leaves other than L1.

At a communication step 104, the spines and leaves forward received packets in accordance with the current forwarding tables used respectively by the spines and leaves. The method then splits into two branches depending on whether a link towards S1 or towards L1 fails.

In the left branch, at a leaf detection step 112, a leaf Li detects that the link between Li and the current detour spine S1 has failed. Li may comprise any of the bipartite leaves including L1. At a leaf notification step 116, Li notifies the other leaves of the link failure. At a spine replacement step 120, each of the leaves reconnects to a spine other than the current default spine. In an embodiment, to support an alternative detour link, each leaf reconnects to a spine connected to the subsequent port—(current port of Li)+1. Increasing the port number by one is carried out modulo the number of leaves.

In the right branch, at a spine detection step 124, a spine S1 detects that the link between Si and the current detour leaf L1 has failed. Si may comprise any of the bipartite spines including Si. At a spine notification step 128, spine Si notifies all the other spines of the link failure. At a leaf replacement step 132, each of the spines reconnects to a leaf other than the current detour leaf. In an embodiment, to support an alternative detour link, each of the spines reconnects to a leaf connected to the subsequent port—(current port of Si)+1. Increasing the port number by one is carried out modulo the number of spines.

Following step 120 or 132, the method loops back to step 104 to forward subsequent packets.

Handling Link Failures in a Topology Comprising Multiple Bipartite Groups

Figure 4:
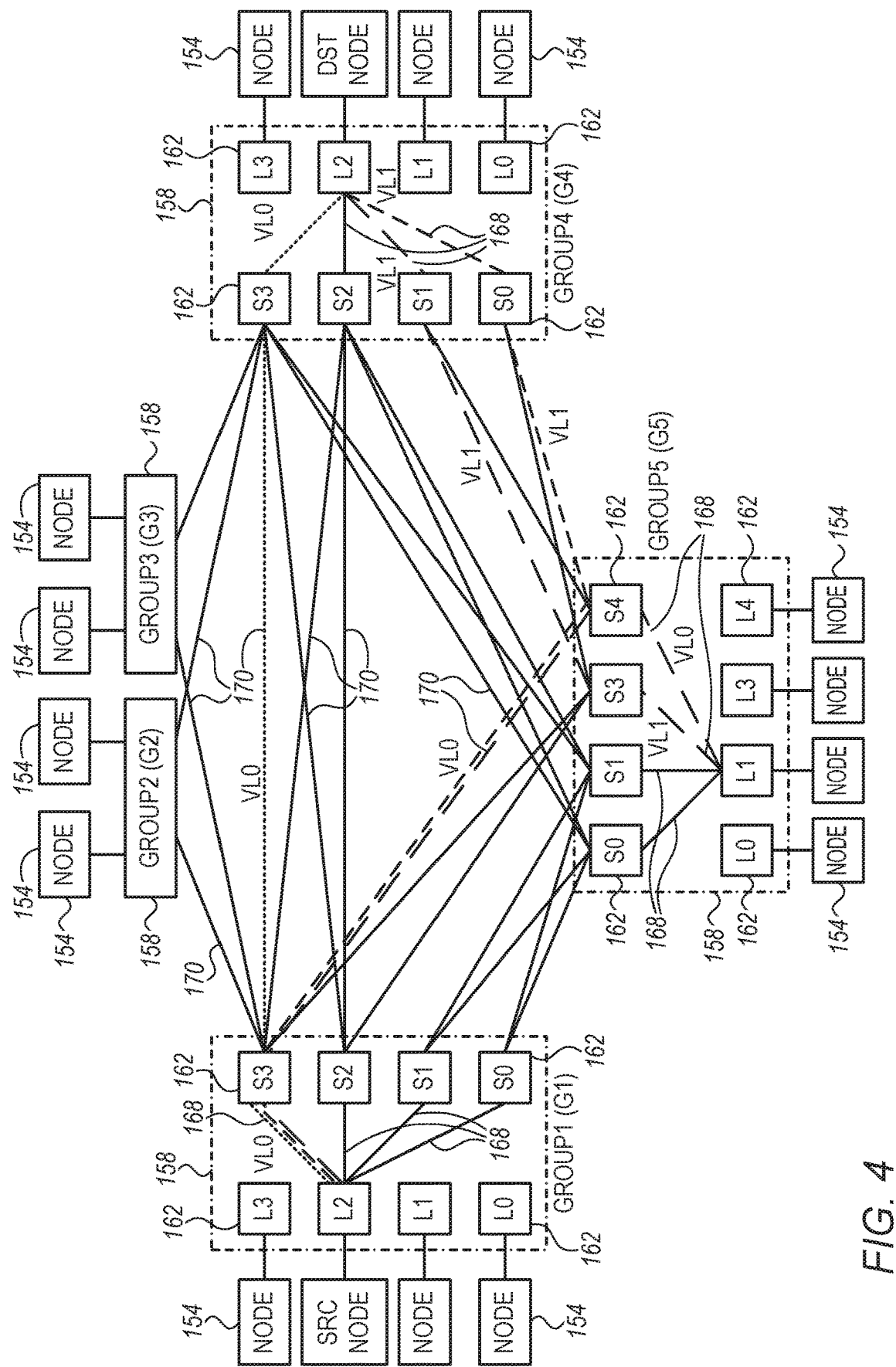
FIG. 4 is a diagram that schematically illustrates a computing system in which a network comprising multiple interconnected bipartite groups, with link failure recovery capabilities, in accordance with an embodiment that is described herein.
Figure 4:
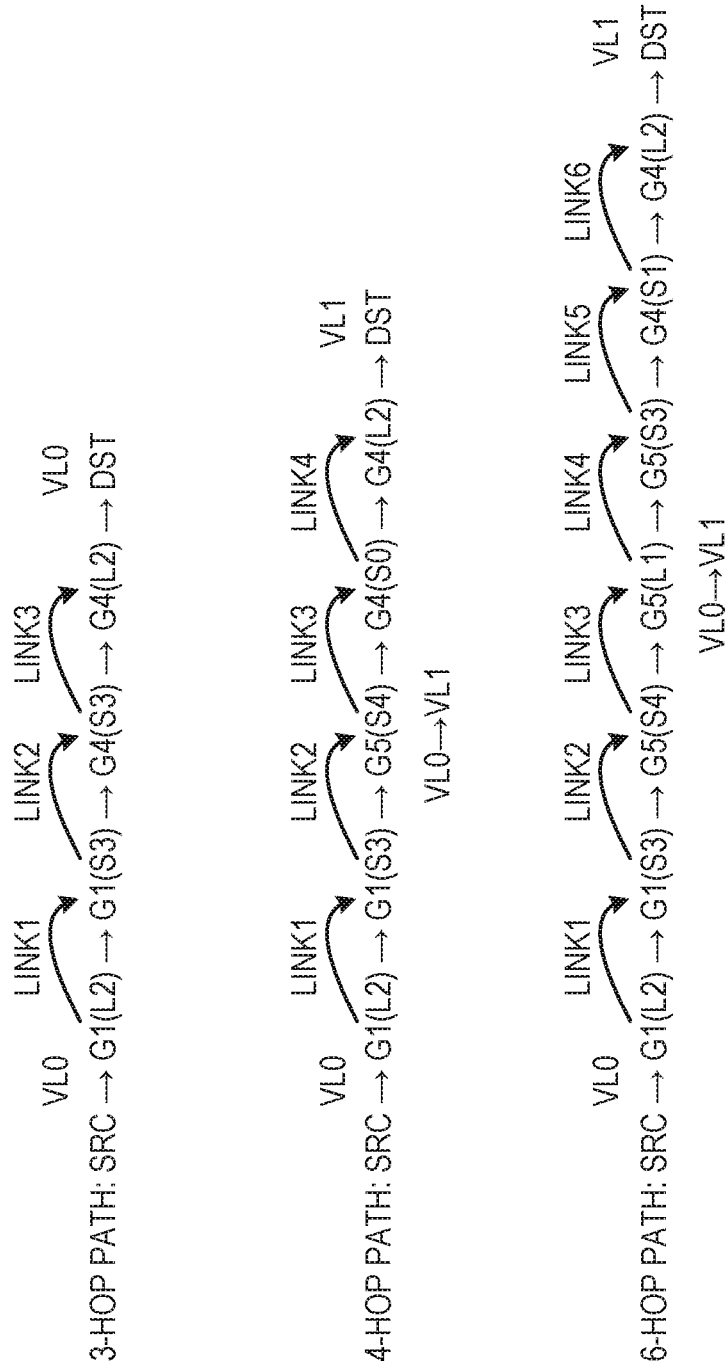

FIG. 4 is a diagram that schematically illustrates a computing system 150 in which a network comprising multiple interconnected bipartite groups, with link failure recovery capabilities, in accordance with an embodiment that is described herein.

Computing system 150 may be used in various applications such as in High Performance Computing (HPC) and in datacenters.

In computing system 150, network nodes 154 are coupled to respective subnetworks (or groups) 158, each having a bipartite topology, e.g., such as network 26 of FIGS. 1 and 2. A group of leaves and spine having a bipartite topology is also referred to herein as a "bipartite group." In the example of computing system 150, an underlying network comprises five bipartite groups 158, denoted G1 . . . G5, each of which comprising eight network elements 162, which are essentially identical to network elements 28 of FIG. 1. In practical systems, however, the underlying network may comprise tens of groups each comprising hundreds and even thousands of network elements.

In FIG. 4, spines and leaves in each group are interconnected using local links 168. Network nodes 154 connect to leaves of the groups, whereas spines of the groups connect to spines of other groups using global links 170. In the present example, within a group 158 each spine connects to all leaves, and all leaves connect to all spines. Note that in FIG. 4, only part of local links 168 and of global links 170 are depicted, for clarity.

Groups 158 may be interconnected (using spines) in various ways. For example, the groups may be interconnected in a Dragonfly Plus (DF+) topology, which is described, for example, in "Dragonfly+: Low Cost Topology for Scaling Datacenters," Conference: HiPINEB 2017 The 3rd IEEE International Workshop on High-Performance Interconnection Networks in the Exascale and Big-Data Era, At Austin, Tex., USA, February, 2017. In small-size topologies, every spine in a group may be connected to every other group using multiple parallel global links. In medium-size topologies, every spine in a group may be connected to every other group using a single global link. In large-size topologies, each pair of groups may be interconnected using a single global link.

In the topology of FIG. 4, consider a global link between Si in group Gi and Sj in a group Gj. The topology includes an alternative global link from Si in Gi to spine other than Sj in group Gj. As such, for each global link from a source spine to a given group, the topology includes an alternative global link from the same source spine to a different spine in the given group. This connectivity allows recovering from a global link failure by using the alternative global link.

The topology of FIG. 4 supports a maximum number of network nodes $(r/2)^2 \cdot (r/4+1)$ for a medium-size topology, and about $(r/2)^4/4$ for a large-size topology (with at least 2 spines connected to a group, wherein 'r' denotes the switch radix, e.g., the total number of switch ports. In a large-size topology and r=40, the number of network nodes is about 40,000.

The topology in FIG. 4, supports 3-hop, 4-hop and 6-hop paths between network nodes coupled to different groups. A diagram depicting the various paths appears at a continuation page of FIG. 4. A 3-hop path from SRC node to DST node, includes a local first link G1(L2-S3), a global second link G1(S3)-G4(S3), and a local third link G4(S3-L2). A 4-hop link from SRC node to DST node, includes a local first link G1(L2-S3), a global second link G1(S3)-G5(S4), a global third link G5(S4)-G4(S0) and a local fourth link G4(S0-L2). A 6-hop link from SRC node to DST node, includes a local first link G1(L2-S3), a global second link G1(S3)-G5(S4), a local third link G5(S4-L1), a local fourth link G5(L1-S3), a global fifth link G5(S3)-G4(S1), and a local sixth link S4(S1-L2).

When all the topology links are operative, to prevent a deadlock condition, the 4-hop and 6-hop paths require modifying the VL value VL0 in the second link to VL1 in the third link. A local link failure within a group is resolved using a detour path as described above. A global link failure is resolved using the alternative link to another spine in the destination group, as described above.

Table 1 depicts a method assignment, for selecting using an Alternative Path (AP) method or a Detour path method for each link failure along the path.

TABLE 1

Method AP or Detour path applied for each link failure along path.

| | link num | | | | | |
|---|---|---|---|---|---|---|
| #hops | Link1 | Link2 | Link3 | Link4 | Link5 | Link6 |
| 3-hop path | AP | AP | Detour | | | |
| 4-hop path | AP | AP | AP | Detour | | |
| 6-hop path | AP | AP | AP | AP | AP | Detour |

As shown in Table 1, a non-final link along the path can be recovered using an alternative path. For example, when in a 3-hop path the first link G1(L1-S3) fails, it can be recovered by L1 connecting to G1(S2) that connects to G4(S3). A detour path is applied when a link fails within a destination group to which DST node connects.

Note that in the 3-hop path, the detour path modifies VL0 to VL1 in entering the leaf-to-spine detour link in the destination group. In contrast, in the 4-hop and 6-hop paths, the packets arrive the detour path in the destination group with a VL already modified from VL0 to VL1.

A detour path contains a spine-to-leaf link and a leaf-to-spine link, which would typically require to increase the VL value in packets traversing the from the spine-to-leaf link to the leaf-to-spine link to avoid a deadlock condition. In the example of FIG. 4, this refers to packets arriving to the destination group with a VL value VL1 in the 4-hop and 6-hop paths.

As will be shown herein, two VL values (e.g., VL0 and VL1) are sufficient for recovering from any single link failure in the entire topology of FIG. 4, without causing a deadlock condition. To prove this argument, note that a single link that fails may be an inter-group link or an intra-group link. An inter-group link failure is resolved using an alternative path, as described above, which causes no deadlock condition. An intra-group link failure is recovered using a detour path that retains the VL1 value for any 4-hop and 6-hop paths that include the faulty link. Since the entire network includes a single turn of a spine-to-leaf link and a leaf-to-spine link, the topology including the detour path is deadlock-free.

Consider now a scenario in the topology of FIG. 4, in which a single intra-link fails in one or more groups (up to the entire groups). Excluding all 6-hop paths, the topology is deadlock-free even when in each group the link failure is resolved using a local detour path and without increasing the VL value. Note that resolving an inter-group link failure using an alternative link was discussed above and causes no credit loop condition. It can be shown that in the topology of FIG. 4, a deadlock condition at VL1 may occur only in 6-hop paths. Therefore in FIG. 4, when excluding 6-hop paths, a single intra-link failure in each of the groups resolved using a detour path and one inter-group link failure using an alternative path is deadlock-free using only two VL levels.

Another mode of operation in the topology of FIG. 4 is based on the method described above in which a default detour link is predefined and shared among multiple detour paths in a fully connected bipartite group. Let N denote the smallest number between the numbers of spines and leaves in the group. As noted above, each group can resolve up to N link failures using detour paths, without causing deadlock. This result also holds in the topology of FIG. 4, in which multiple groups have respective preselected default detour links. In this case multiple groups can each handle up to N simultaneous link failures in the multiple groups simultaneously without causing a deadlock condition. As noted above, N is achievable when the bipartite topologies in the groups are fully connected.

The configurations of computers systems 20 in FIG. 1, 50 in FIG. 2 and 150 in FIG. 3 and the configuration of network element 28 in FIG. 1, are given by way of example, and other suitable computer systems and network element configurations can also be used.

Some elements of network element 28, such as packet processor 34 and switch controller 40 may be implemented in hardware, e.g., in one or more Application-Specific Integrated Circuits (ASICs) or Field-Programmable Gate Arrays (FPGAs). Additionally or alternatively, some elements of the network element can be implemented using software, or using a combination of hardware and software elements.

Elements that are not necessary for understanding the principles of the present application, such as various interfaces, addressing circuits, timing and sequencing circuits and debugging circuits, have been omitted from FIG. 1 for clarity.

Memory 36 may comprise any suitable storage device using any suitable storage technology, such as, for example, a Random Access Memory (RAM).

In some embodiments, some of the functions of network elements 28 and 162 (e.g., functions of switch controller 40) may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The embodiments described above are given by way of example and other suitable embodiments can also be used. For example, although in some of the embodiments above the groups of spines and leaves are described as interconnected in a fully connected bipartite topology, this is not mandatory. The disclosed embodiments are applicable even when the bipartite groups of spines and leaves are not fully connected. In such embodiments, a detour path may be applicable only to a partial subset of the links that fail in the group.

The underlying network 26 in FIGS. 1 and 2 and the multi-group topology in FIG. 4 may comprise any suitable packet network operating using any suitable protocols. These networks may comprise, for example, an InfiniBand™ network, or an Ethernet network.

Although the embodiments described herein mainly address Fat-Tree and Dragonfly+ topologies, the methods and systems described herein can also be used in other applications, such as in any other suitable topology containing groups based on the bipartite graph.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing system comprising:
multiple network elements arranged in at least one group, wherein a plurality of the network elements in the group are designated as spines and another plurality are designated as leaves, wherein the spines and the leaves in the group are interconnected in a bipartite topology, and wherein at least some of the spines and leaves in the group are to:
receive in a first leaf, from a source node, packets destined to be delivered to a destination node via a second leaf, and forward the packets by the first leaf, via a first link, to a first spine, and forward the packets by the first spine to the second leaf via a second link; and in response to detecting that the second link has failed:
apply a detour path from the first leaf to the second leaf, the detour path including a detour link that delivers packets in a spine-to-leaf direction and another detour link that delivers packets in a leaf-to-spine direction; and
forward subsequent packets, which are received in the first leaf and are destined to the second leaf, via the detour path,
wherein the spines and the leaves in the group are further to apply multiple detour paths concurrently, for resolving multiple simultaneous link failures in the group, the multiple detour paths sharing a common detour link preselected between a given spine and a given leaf in the group.

2. The computing system according to claim 1, wherein the detour path is predefined, and wherein the at least some of the spines and leaves in the group are to apply the detour path by applying the predefined detour path.

3. The computing system according to claim 1, wherein the at least some of the spines and leaves in the group are to apply the detour path by communicating with one another.

4. The computing system according to claim 1, wherein the failing link connects to a given port of a spine or a leaf, wherein the spine or the leaf is to apply the detour path by forwarding received packets to a port different from the given port.

5. The computing system according to claim 1, wherein in response to detecting by the first leaf that the first link has failed, the at least some of the spines and leaves in the group are to select an alternative path from the first leaf to the second leaf via a second spine.

6. The computing system according to claim 1, wherein in response to detecting by the first spine that the second link has failed and further detecting by the first leaf that the first link is operative, the at least some of the spines and leaves in the group are to apply the detour path including a path from the first spine to the second leaf via a third leaf and a second spine.

7. The computing system according to claim 1, wherein the first spine is to receive packets destined to the second leaf via the second link, from a remote spine outside the group, and in response to detecting by the first spine that the second link has failed, the spines and leaves in the group are to apply the detour path including a partial path from the first spine to the second leaf via a third leaf and a second spine.

8. The computing system according to claim 1, wherein the multiple spines and the multiple leaves are arranged in multiple groups, each group comprising multiple spines and multiple leaves interconnected in a bipartite topology, wherein each group connects to other groups using spine-to-spine links, wherein a topology of the multiple spines and multiple leaves is deadlock-free using up to a number Nv of Virtual Lanes (VLs), wherein when a single link failure occurs within the group but not in any other link in the topology, the spines and the leaves in the group are to resolve the failing link using a detour path that includes a detour link in a spine-to-leaf direction and another detour link delivering packets in a leaf-to-spine direction, and wherein the topology including the detour path is also deadlock-free using up to Nv VLs.

9. The computing system according to claim 8, wherein a first spine in a first group connects via a first link to a second spine in a second group and connects via a second link to a third spine in the second group, wherein both the second spine and the third spine connect to a common leaf in the second group, and wherein in response to detecting, by the first spine, that the first link has failed, the first spine is to forward packets to the common leaf via the second link.

10. The computing system according to claim 8, wherein the spines and leaves are to support source node to destination node paths having up to four concatenated links, and wherein in response to two or more single-link failures occurring within respective two or more groups simultaneously, the spines and leaves in the two or more groups are to resolve the link failures locally, using respective two or more detour paths, each detour path including a detour link that delivers packets in a spine-to-leaf direction and another detour link that delivers packets in a leaf-to-spine direction, and wherein the topology including the two or more detour paths remains deadlock-free.

11. The computing system according to claim 1, wherein a given spine and a given leaf in the group are preselected to serve as a detour link in a leaf-to-spine direction, wherein the at least some of the spines and leaves in the group are to apply a given detour path that includes a spine-to-leaf link and the detour link that resolves a link failure between another spine and another leaf in the group.

12. The computing system according to claim 11, wherein the group comprising Ns spines and Nl leaves, and wherein the at least some of the spines and leaves in the group are to resolve, using a detour path that includes a spine-to-leaf link and the detour link, up to (N−1) simultaneous link failures within the group, N being a smallest number between Ns and Nl.

13. The computing system according to claim 11, wherein in response to detecting, by a leaf connected via a given link to the given spine that the given link has failed, the leaf is to connect to another spine for serving as a detour link with the given leaf instead of the given spine, and to notify the other leaves in the group to connect to the another spine.

14. The computing system according to claim 11, wherein in response to detecting, by a spine connected via a given link to the given leaf that the given link has failed, the spine is to connect to another leaf for serving as a detour link with the given spine instead of the given leaf, and to notify the other spines in the group to connect to the another leaf.

15. The computing system according to claim 11, wherein the group belongs to a plurality of groups interconnected using spine-to-spine links, wherein in each of the groups respective detour link in a spine-to-leaf direction and another detour link in a leaf-to-spine direction are preselected for locally resolving, using a detour path that includes the respective detour link and another detour link, up to a respective number N' of simultaneous link failures smaller than both the number of spines and the number of leaves in the group, wherein the spines and the leaves in the groups are to support source node to destination node paths having up to four concatenated links, and wherein a topology of the spines and the leaves in the groups is deadlock-free even when numbers up to N' of link failures are resolved simultaneously in the respective groups using the respective detour links.

16. A method comprising:
in a computing system comprising multiple network elements arranged in at least one group, wherein a plurality of the network elements in the group are designated as spines and another plurality are designated as leaves, and wherein the spines and the leaves in the group are interconnected in a bipartite topology, receiving in a first leaf, from a source node, packets destined to be delivered to a destination node via a second leaf, and forwarding the packets by the first leaf, via a first link, to a first spine, and forwarding the packets by the first spine to the second leaf via a second link; and in response to detecting that the second link has failed:

applying a detour path from the first leaf to the second leaf, the detour path including a detour link that delivers packets in a spine-to-leaf direction and a detour link that delivers packets in a leaf-to-spine direction; and forwarding subsequent packets, which are received in the first leaf and are destined to the second leaf, via the detour path and further applying by the spines and the leaves in the group multiple detour paths concurrently, for resolving multiple simultaneous link failures in the group, the multiple detour paths sharing a common detour link preselected between a given spine and a given leaf in the group.

17. The method according to claim 16, wherein the detour path is predefined, and wherein applying the detour path comprises applying the predefined detour path.

18. The method according to claim 16, wherein applying the detour path comprises applying the detour path by at least some of the spines and leaves communicating with one another.

19. The method according to claim 16, wherein the failing link connects to a given port of a spine or a leaf, wherein applying the detour path comprises forwarding received packets to a port different from the given port.

20. The method according to claim 16, wherein in response to detecting that the first link has failed, selecting an alternative path from the first leaf to the second leaf via a second spine.

21. The method according to claim 16, wherein in response to detecting that the second link has failed and further detecting that the first link is operative, applying the detour path including a path from the first spine to the second leaf via a third leaf and a second spine.

22. The method according to claim 16, wherein the first spine receives packets destined to the second leaf via the second link, from a remote spine outside the group, and in response to detecting that the second link has failed, applying the detour path including a partial path from the first spine to the second leaf via a third leaf and a second spine.

23. The method according to claim 16, wherein the multiple spines and the multiple leaves are arranged in multiple groups, each group comprising multiple spines and multiple leaves interconnected in a bipartite topology, wherein each group connects to other groups using spine-to-spine links, wherein a topology of the multiple spines and multiple leaves is deadlock-free using up to a number Nv of Virtual Lanes (VLs), and comprising, when a single link failure occurs within the group but not in any other link in the topology, resolving the failing link using a detour path that includes a detour link in a spine-to-leaf direction and another detour link delivering packets in a leaf-to-spine direction, wherein the topology including the detour path is also deadlock-free using up to Nv VLs.

24. The method according to claim 23, wherein the spines and leaves support source node to destination node paths having up to four concatenated links, and comprising, in response to two or more single-link failures occurring within respective two or more groups simultaneously, resolving, by the spines and leaves in the two or more groups the link failures locally, using respective two or more detour paths, each detour path including a detour link that delivers packets in a spine-to-leaf direction and another detour link that delivers packets in a leaf-to-spine direction, and wherein the topology including the two or more detour paths remains deadlock-free.

25. The method according to claim 23, wherein a first spine in a first group connects via a first link to a second spine in a second group and connects via a second link to a third spine in the second group, wherein both the second spine and the third spine connect to a common leaf in the second group, and comprising, in response to detecting that the first link has failed, forwarding packets to the common leaf via the second link.

26. The method according to claim 16, wherein a given spine and a given leaf in the group are preselected to serve as a detour link in a leaf-to-spine direction, and comprising, applying by at least some of the spines and leaves in the group, a given detour path that includes a spine-to-leaf link and the detour link, and that resolves a link failure between another spine and another leaf in the group.

27. The method according to claim 26, wherein the group belongs to a plurality of groups interconnected using spine-to-spine links, wherein in each of the groups respective detour link in a spine-to-leaf direction and another detour link in a leaf-to-spine direction are preselected for locally resolving, using a detour path that includes the respective detour link and another detour link, up to a respective number N' of simultaneous link failures smaller than both the number of spines and the number of leaves in the group, and comprising supporting by the spines and the leaves in the groups source node to destination node paths having up to four concatenated links, wherein a topology of the spines and the leaves in the groups is deadlock-free even when numbers up to N' of link failures are resolved simultaneously in the respective groups using the respective detour links.

28. The method according to claim 26, wherein the group comprising Ns spines and Nl leaves, and comprising resolving, by the at least some of the spines and leaves in the group, using a detour path that includes a spine-to-leaf link and the detour link, up to (N−1) simultaneous link failures within the group, N being a smallest number between Ns and Nl.

29. The method according to claim 26, and comprising, in response to detecting that a given link from a leaf to the given spine has failed, connecting by the leaf to another spine for serving as a detour link with the given leaf instead of the given spine, and notifying the other leaves in the group to connect to the another spine.

30. The method according to claim 16, and comprising, in response to detecting that a given link to the given leaf has failed, connecting by the spine to another leaf for serving as a detour link with the given spine instead of the given leaf, and notifying the other spines in the group to connect to the another leaf.

* * * * *